United States Patent [19]

Harasaki et al.

[11] 4,362,331
[45] Dec. 7, 1982

[54] AUTOMOBILE FRONT BODY CONSTRUCTION

[75] Inventors: Hayathugu Harasaki; Yoshihiro Morimoto, both of Hiroshima, Japan

[73] Assignee: Tokyo Kogyo Co., Ltd., Hiroshima, Japan

[21] Appl. No.: 223,293

[22] Filed: Jan. 8, 1981

[30] Foreign Application Priority Data

Jan. 16, 1980 [JP] Japan ............................ 55/3770[U]

[51] Int. Cl.³ ............................................ B60K 20/08
[52] U.S. Cl. .................................... 296/194; 180/90; 296/37.12
[58] Field of Search ............ 296/194, 188, 189, 37.12; 180/90

[56] References Cited

U.S. PATENT DOCUMENTS

| | | | |
|---|---|---|---|
| 2,798,737 | 7/1957 | Sundlor | 296/189 |
| 2,978,055 | 4/1961 | Barenyi | 180/90 |
| 3,376,947 | 4/1968 | Barenyi | 180/90 |
| 3,819,224 | 6/1974 | Casey | 296/189 |
| 3,829,149 | 8/1974 | Stevens | 296/189 |
| 3,868,141 | 2/1975 | Johnson | 296/189 |
| 3,924,707 | 12/1975 | Renner | 180/90 |
| 3,947,056 | 3/1976 | Schwanz | 180/90 |
| 4,270,793 | 6/1981 | Harasaki | 180/90 |

*Primary Examiner*—David M. Mitchell
*Assistant Examiner*—John A. Carroll
*Attorney, Agent, or Firm*—Wenderoth, Lind & Ponack

[57] ABSTRACT

An automobile front body construction which includes a reinforced beam assembly extending between a pair of front pillars. The reinforced beam assembly includes an elongated main frame member of generally U-shaped cross-section, having a wall section and upper and lower flanges protruding from the wall section generally at right angles thereto. The main frame member also has a generally rectangular opening extending in face-to-face relation to the wall section and over the entire length thereof. An elongated closure member closes the rectangular opening and is positioned in spaced and face-to-face relation to the wall section, the opposite end portions of the wall section being rigidly secured to an upper dash panel. The opposite ends of the closure member are rigidly connected to the respective front pillars.

6 Claims, 5 Drawing Figures

1

AUTOMOBILE FRONT BODY CONSTRUCTION

BACKGROUND OF THE INVENTION

The present invention generally relates to an automobile body construction and, more particularly, to an automobile front body construction including a reinforced beam assembly extending between a pair of front body hinge pillars for the support of a steering shaft column.

Heretofore, the steering shaft has been supported by a bracket mounted on and protruding from an automobile front body, for example, an upper dash panel. However, it has been found that, since the front body supporting the bracket has relatively little physical strength and rigidity (because the automobile body is designed to reduce the overall weight thereof), the steering shaft tends to undergo such lateral oscillation when running at high speed as to result in reduced drivability and reduced safety of the automobile. In addition, it has also been found that, once an automobile collision takes place, the steering shaft supporting the bracket, together with the front body tends to collapse towards the driver's seat, resulting in injury to the driver and passengers.

In order to avoid the problems discussed above, there has been proposed the employment of a reinforced beam for the support of the steering shaft column, which extends between the front body hinge pillars, for the purpose of reinforcing the steering shaft column.

SUMMARY OF THE INVENTION

The present invention has been developed with a view to substantially eliminating the disadvantages and inconveniences inherent in the prior art automobile front body construction and has for its essential object to provide an improved automobile front body construction including a reinforced beam assembly which is easy to install and effective to reinforce the physical strength and rigidity of the front body construction.

Another important object of the present invention is to provide an improved automobile front body construction of the type referred to above, which is also effective to minimize, or substantially eliminate, the possible lateral oscillation of the steering shaft and also the possible collapse of the steering shaft during an automobile collision.

BRIEF DESCRIPTION OF THE DRAWINGS

These and other objects and features of the present invention will become apparent from the following description taken in conjunction with a preferred embodiment thereof with reference to the accompanying drawings, in which.

DETAILED DESCRIPTION OF THE INVENTION

Figure 1:
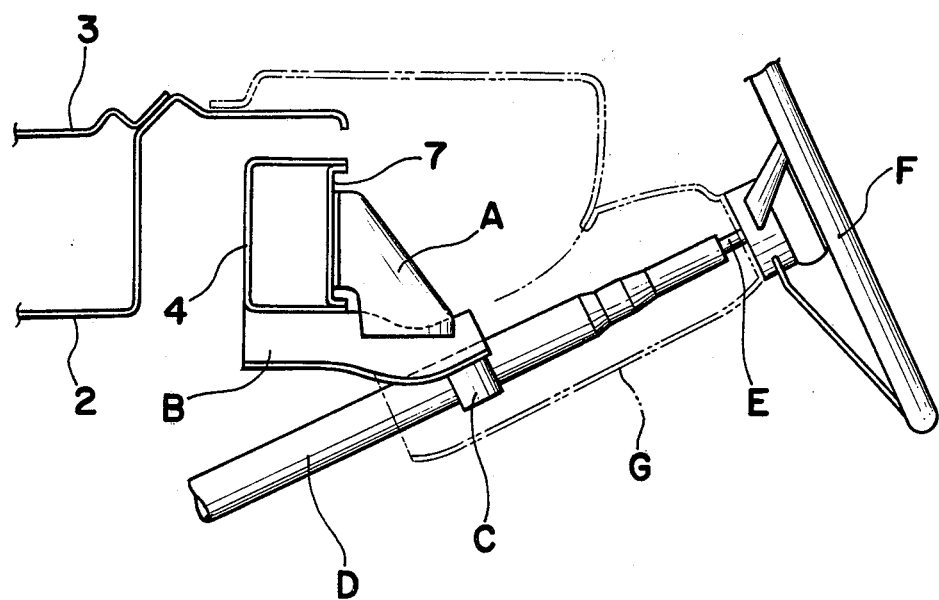
FIG. 1 is an explanatory sectional view, taken from the side, showing a steering shaft supported by an automobile front body construction in accordance with the present invention.
Figure 2:
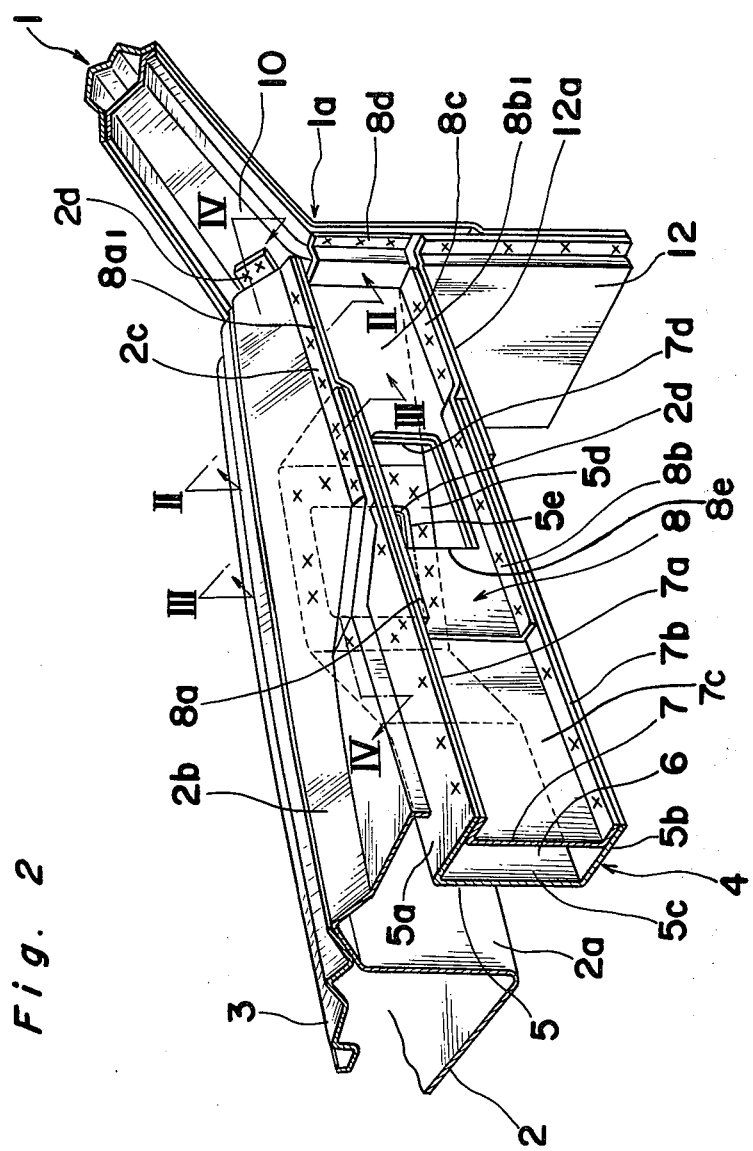
FIG. 2 is a perspective view of an automobile front body construction embodying the present invention as viewed from the interior of an automobile body.

Before the description of the present invention proceeds, it is to be noted that like parts are designated by like reference numerals throughout the drawings.

Referring to FIG. 1, a steering shaft E of a steering wheel F is rotatably supported and inserted into a steering column D which is supported by a blanket C provided on and protruding from a pair of reinforcement jackets A, B covered by a column cover G and fixedly mounted on a reinforced beam assembly of an automobile front body construction as described in detail hereinafter.

Referring to FIGS. 2 to 5, there is shown one of the opposite front body hinge pillars for the hinged support of left-hand and right-hand vehicle doors, (not shown) designated by the numeral 1. Extending between these pillars 1 is an upper dash panel 2 from which a cowl panel 3 extends frontwardly with respect to an automobile body (not shown). A reinforced beam assembly for the support of a steering shaft column is shown generally by 4 and extends between the pillars 1 and below the dash panel upper 2 as subsequently will be described in detail.

The upper dash panel 2 has an upright wall 2a and an upper wall 2b generally at right angles to the upright wall 2a. The reinforced beam assembly 4 is positioned below the upper wall 2b and in spaced relation to the upright wall 2a and extends between the pillars 1 while facing towards the interior of the automobile body (not shown). Reinforced beam assembly 4 comprises an elongated main frame 5 of generally U-shaped cross-section, a first channel member 7 closing an entire rearward opening of the main frame 5 with a generally rectangular-sectioned space 6 defined therebetween, and a pair of opposite second channel members 8 (only one of which is shown in the drawings) which are secured respectively to the opposite ends of the first channel-member 7, each of the second channel members 8 extending outwardly from the corresponding end of the first channel member 7 and terminating in abutment with the adjacent pillar 1.

The main frame 5 has upper and lower flanges 5a and 5b to which upper and lower flanges 7a and 7b of the first channel member 7 are secured by means of a plurality of spot welds. The second channel member 8 also has upper and lower flanges 8a and 8b. It is to be noted that, in the assembled condition, portions of the respective upper and lower flanges 8a and 8b of the second channel member 8 which protrude beyond both the main frame 5 and the first channel member 7 are so stepped at 8a1 and 8b1, respectively, as to permit outer surfaces of the respective upper and lower flanges 8a and 8b to be substantially flush with the upper and lower flanges 5a and 5b of the main frame 5.

An upright wall 5c of the main frame 5, which lies between the upper and lower flanges 5a and 5b and is positioned in spaced relation, and generally parallel to, the upright wall 2a of the upper dash panel 2, has its opposite ends shaped to protrude frontwardly to define respective connecting areas 5d through which main frame 5 is rigidly secured to the opposite end portions of the upright wall 2a of the upper dash panel 2 by means of a plurality of welds. The portions of the upper dash panel 2 connecting to connection areas 5d of main frame 5 have ventilation openings 2d defined therein. The connecting areas 5d of the main frame 5, a front upright wall 7c of the first channel member 7 and a front upright wall 8c of the second channel member 8 all have respective ventilation openings 5e, 7d and 8e defined therein in alignment with the ventilation opening 2d in the upper dash panel 2.

The free end of the second channel member 8 adjacent each pillar 1 is stepped at 8c in a direction rearwardly of the front upright wall 8c to define a connecting area 8d through which the second channel member 8 is rigidly secured to a pillar inner wall 1a of the pillar 1 by means of a plurality of spot welds.

A hinge pillar inner bracket 12 at a lower end of each pillar 1 has an upper end stepped inwardly to define a support area 12a which supports from below and is rigidly connected partly to the lower flange 5b of the main frame 5 and also partly to the second channel member 8, by means of a plurality of spot welds. It is to be noted that, at the portion of the support area 12a which is welded to the lower flange 5b of the main frame 5, the hinge pillar inner bracket 12, the lower flange 5b of the frame 5, the lower flange 7b of the first channel member 7 and the lower flange 8b of the second channel member 8 are all welded together to provide a four-layer sandwich connection.

The upper wall 2b of the upper dash panel 2 extends downwards at each of its opposite end portions, the tip of which is bent to define a connecting area 2c for the support of the reinforced beam assembly. Specifically, this connecting area 2c of the upper wall 2b of the upper dash panel upper 2 supports from above, and is rigidly connected partly to, the upper flange 5a of the main frame 5 and also partly to the upper flange 8a of the second channel member 8 by means of a plurality of spot welds. Thus, at the portion of the connecting area 2c which is welded to the upper flange 5a of the main frame 5, the upper dash panel 2, the upper flange 5a of the main frame 5, the upper flange 7a of the first channel member 7 and the upper flange 8a of the second channel member 8 are all welded together to provide a four-layer sandwich connection.

Figure 3:
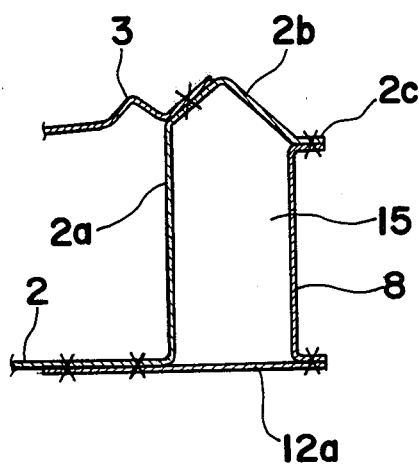
FIGS. 3 to 5 are cross-sectional views taken along the line II—II, III—III and IV—IV in FIG. 2, respectively.
Figure 4:
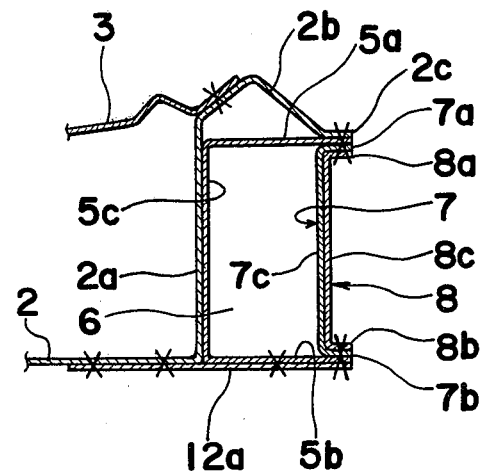
Figure 5:
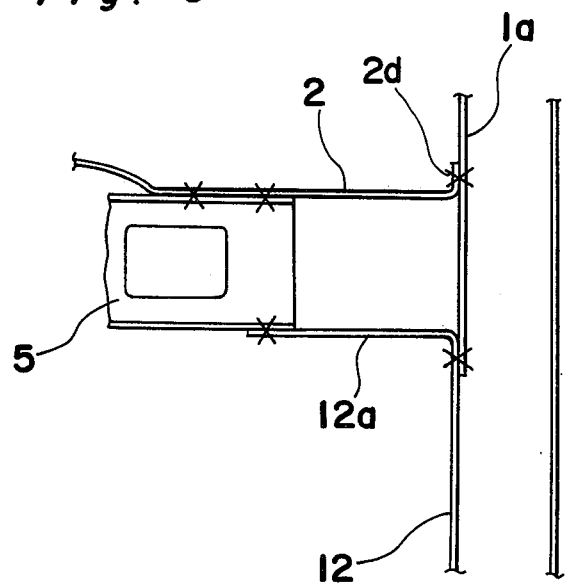

The tip of the upper dash panel 2 which protrudes beyond the connecting area 5d of the main frame 5 is, as best shown in FIG. 3, closed by both the second channel member 8 and the hinge pillar inner bracket 12 so as to define a generally rectangular cross-sectioned space 15. The reinforced beam assembly is, therefore, as illustrated in FIGS. 3 and 4, supported at each end by a front pillar 1 with the spaces 6 and 15 communicating with each other to define a completely sealed hollow of generally rectangular cross-section. The upper dash 2 has a connecting area 2d defined at an upper front portion thereof, rigidly connected to a pillar inner wall 1a while the cowl panel 3 is rigidly secured to a front inclined area on the upper wall 2b of the upper dash panel 2. The present invention as described above has the following advantages:

(1) Since the reinforced beam assembly has a relatively large closed hollow defined therein, it has relatively great physical strength and rigidity.

(2) Since the clearance between the main frame and each pillar communicates with the space defined by the upper dash panel, the second channel member and the inner hinge pillar bracket as to provide the reinforced beam assembly with the closed hollow, the physical strength and supporting rigidity of the reinforced beam assembly can be improved.

(3) Since the reinforced beam assembly and either of the upper dash panel and the pillar inner wall are connected by any known spot welding technique, installation can readily and accurately be performed in a minimum period of time.

(4) Since the side, front, upper and lower faces of the reinforced beam assembly are rigidly secured to the front pillar inner wall, the upper dash panel and the hinge pillar inner bracket, the reinforced beam assembly can be supported with an improved rigidity.

(5) Since the reinforced beam assembly has a relatively great physical strength and is supported with the relatively great rigidity, any possible lateral oscillation of the steering shaft during high speed running of the automobile can be minimized or substantially eliminated with an improved steerability.

(6) Since the reinforced beam assembly is installed with improved rigidity, any possible retraction of the steering shaft during an automobile collision can be minimized for substantially avoided, resulting in improved safety.

(7) Since the reinforced beam assembly is supported connected to the hinge pillars, the side door assemblies can also be supported rigidly.

Although the present invention has fully been described in connection with the embodiment thereof with reference to the accompanying drawings, it is pointed out that various changes and modifications are obvious to those skilled in the art. Such changes and modifications are, unless they depart from the scope of the appended claims, to be construed as included therein.

We claim:

1. In an automobile front body having a steering column, the improvement comprising:

a pair of front pillars for hingedly supporting left and right doors of the automobile;

an upper dash panel protruding frontwardly of the automobile front body, to which said steering column is fixed, respectively fixed at opposite ends to each of said pair of front pillars, said upper dash panel having an upright wall having first opposite end portions adjacent said opposite ends; and a reinforced beam assembly including an elongated main frame member of generally U-shaped cross-section, having a wall section and upper and lower flanges respectively extending along its length between said pair of front pillars, defining three sides of a first space having a generally rectangular cross-section, and an elongated closure member spaced from said wall section in face-to-face relation thereto along the entire said length to close said generally rectangular cross-section of said first space and rigidly fixed at opposite ends to said pair of front pillars;

said reinforced beam assembly having a central portion and two second end portions at opposite sides of said central portion, being located rearward of said upper dash panel, said central portion being in spaced relation to said upright wall of said upper dash panel, said two second end portions being rigidly secured to said first opposite end portions of said upright wall.

2. The improvement as in claim 1, wherein said second end portions constitute second end portions of said wall section of said main frame member, said second end portions protruding frontwardly into face-to-face fixed contact with said upright wall of said upper dash panel adjacent said pair of front pillars, said cross-sectional area of said first space being larger at said second end portions than at said central portion.

3. The improvement as in claim 2, wherein said upper dash panel upright wall has an upper edge, said upper dash panel further comprising an upper wall extending rearwardly from said upper edge; said improvement further comprising a pair of hinge pillar inner brackets fixed to said pair of front pillars, having third end portions extending toward said central portion of said reinforced beam assembly, said upper dash panel, said third end portions of said pair of hinge pillar inner brackets and said closure member surrounding a second space having a generally rectangular cross-section.

4. The improvement as in claim 3, wherein said second end portions and the portions of said upright wall in fixed face-to-face contact therewith have ventilation openings formed therein.

5. The improvement as in claim 4, wherein said closure member includes a first member, having opposite fourth end portions, rearward of said wall portion extending over the entire length of said main frame member, and a pair of second members having fifth end portions connected in overlapping relation to said fourth end portions of said first member and sixth end portions at opposite ends thereof from said fifth end portions in abutment with said pair of front pillars, second ventilation openings being formed in said first and second members where said first and second members overlap.

6. The improvement as in claim 3, wherein said first and second spaces open into each other, said third portions of said pair of hinge pillar inner brackets extending toward said central portion below said closure member and said upright wall and being fixed thereto.

* * * * *